April 16, 1935.  N. D. LEVIN  1,997,591
MATERIAL HANDLING MECHANISM
Original Filed Sept. 6, 1930    4 Sheets-Sheet 1
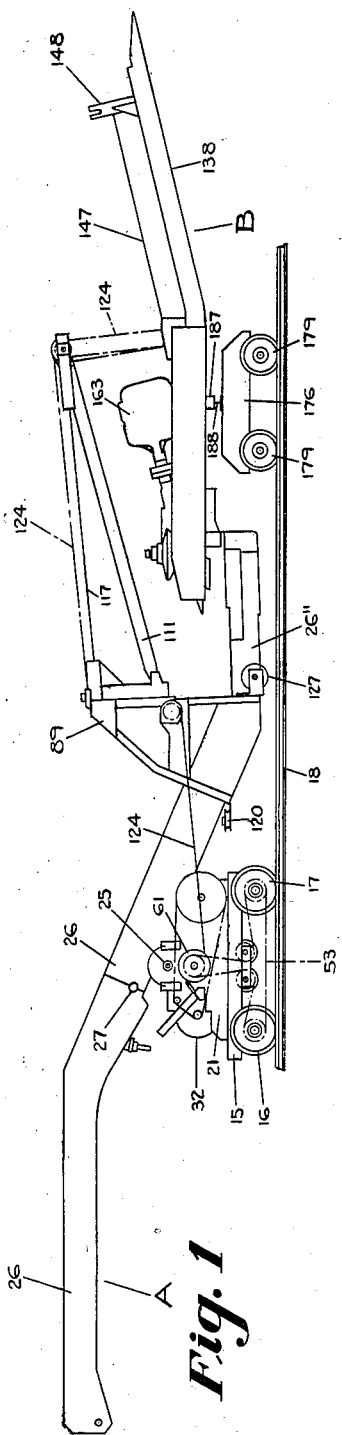
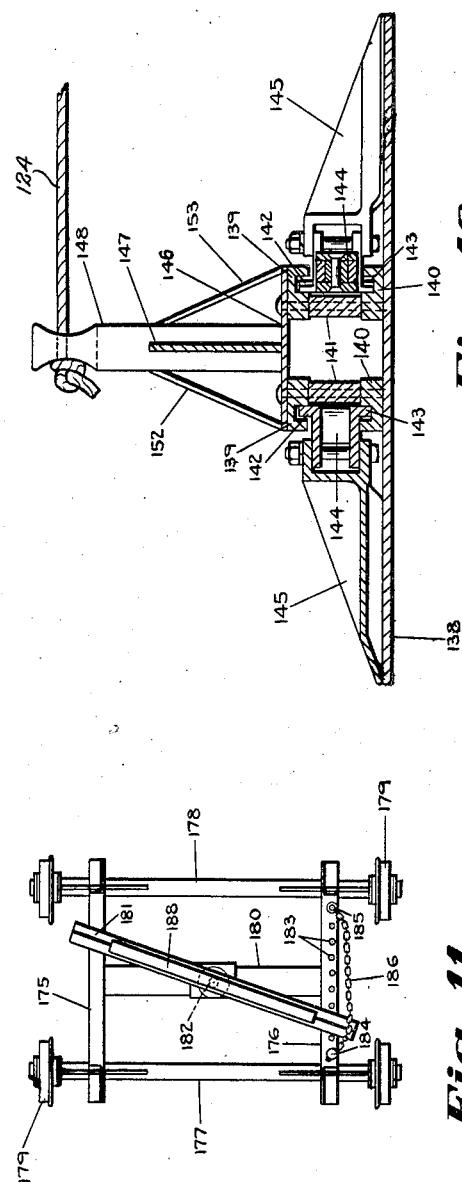
INVENTOR
Nils D. Levin.

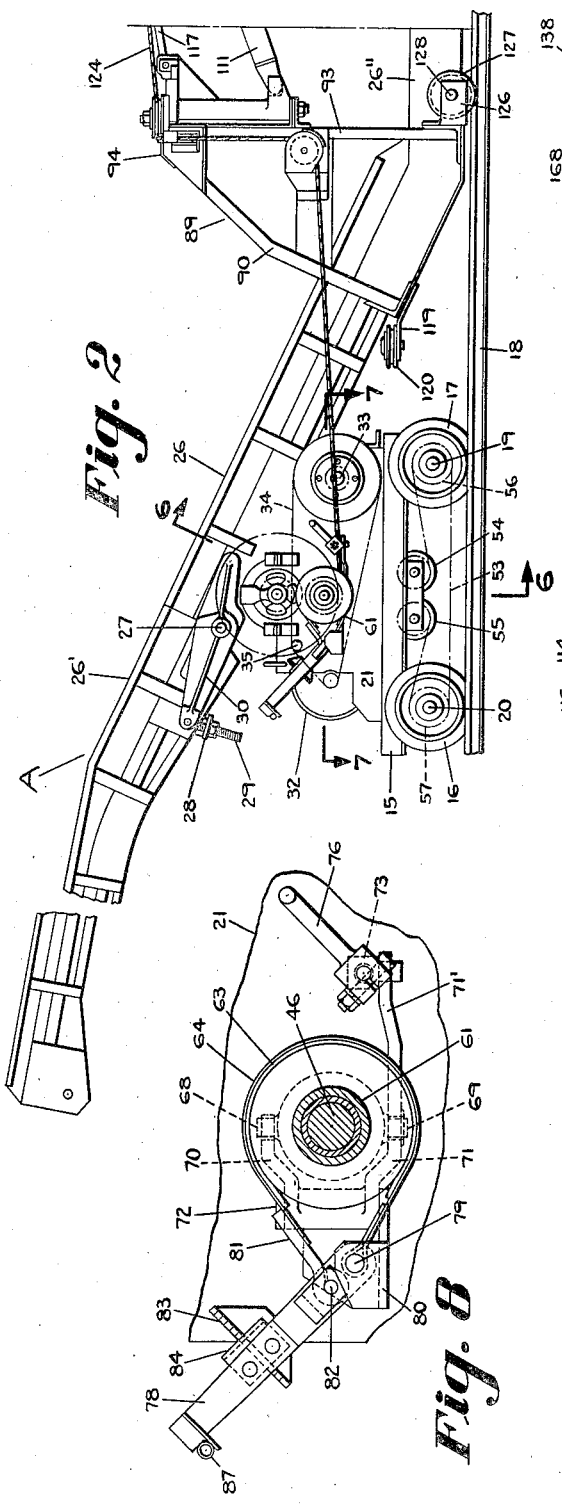

April 16, 1935.   N. D. LEVIN   1,997,591
MATERIAL HANDLING MECHANISM
Original Filed Sept. 6, 1930   4 Sheets-Sheet 3
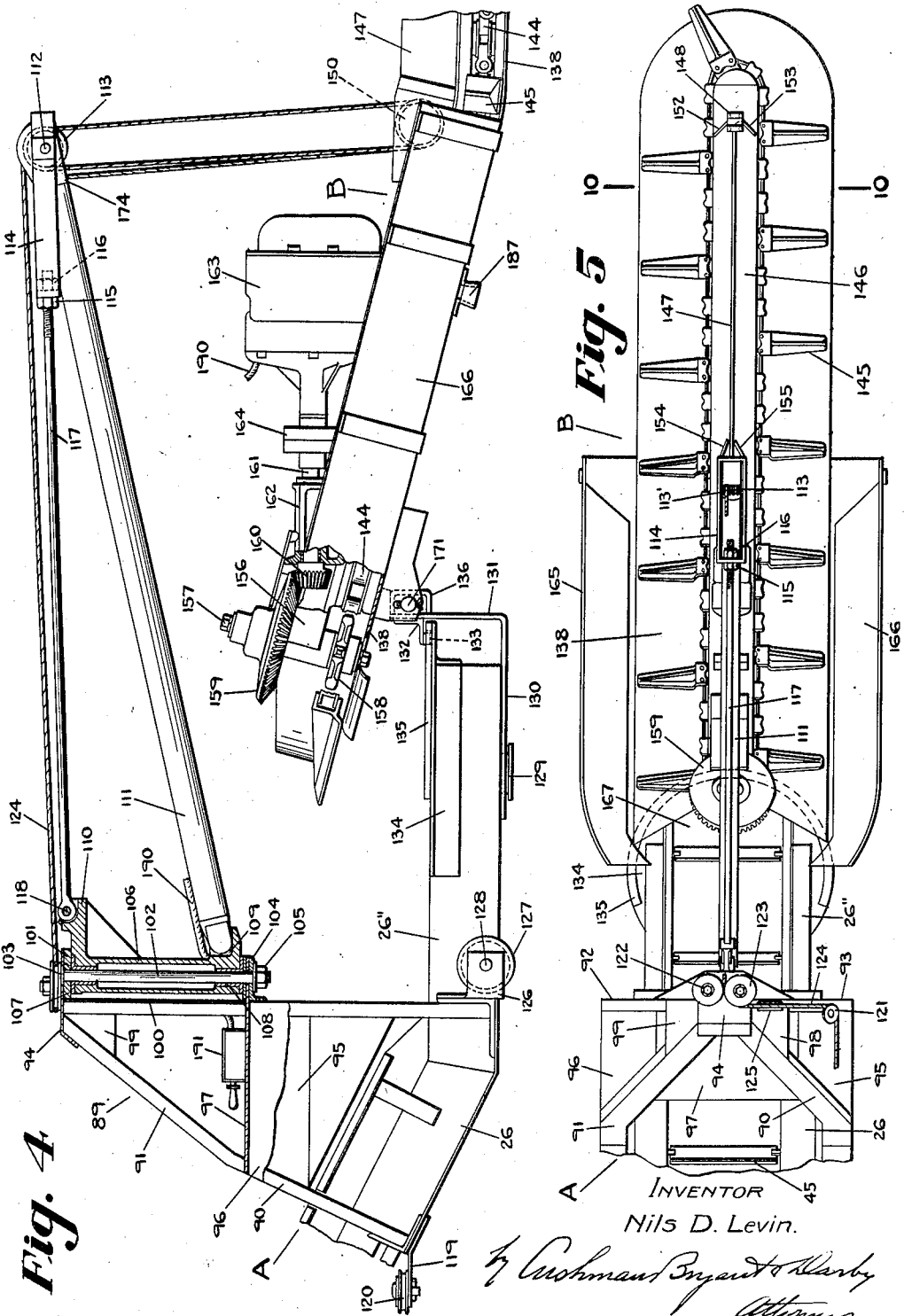
INVENTOR
Nils D. Levin.

April 16, 1935.   N. D. LEVIN   1,997,591
MATERIAL HANDLING MECHANISM
Original Filed Sept. 6, 1930   4 Sheets-Sheet 4

INVENTOR
Nils D. Levin.

Patented Apr. 16, 1935

1,997,591

UNITED STATES PATENT OFFICE 1,997,591

MATERIAL HANDLING MECHANISM

Nils D. Levin, Columbus, Ohio, assignor to The Jeffrey Manufacturing Company, Columbus, Ohio, a corporation of Ohio Application September 6, 1930, Serial No. 480,216
Renewed January 9, 1935

22 Claims. (Cl. 198—7)

The present invention relates to a loading machine, and particularly to such a machine adapted to be moved about a mine over the mine tracks and while positioned thereon to load out material from the various workings.

The general characteristics of the machine according to the present invention are: A truck mounted discharge conveyor having a receiving end adapted to be positioned in proximity to the mine track and a delivery end adapted to deliver at elevated points to the rear of the truck, the conveyor being swingable relative to the truck about both vertical and horizontal axes; a gathering conveyor having its delivery end pivoted to and above the receiving end of the discharge conveyor for swinging movement in vertical and horizontal planes relative to the latter and for tilting movement about its own longitudinal axis, the two conveyors being separably connected; a pony truck adapted to be positioned beneath and placed in temporary connection with the gathering conveyor when the machine is to be transported from place to place in the mine; a jib mounted on the receiving end of the discharge conveyor and extending above the gathering conveyor; hoisting tackle connecting the jib and the gathering conveyor; and power devices for operating the conveyors, for operating the hoisting devices, for swinging the gathering conveyor in horizontal planes relative to the discharge conveyor to engage it laterally in material to be loaded out, and for propelling the conveyor supporting means to sump the gathering conveyor or to transport the machine as a whole over the mine tracks.

In the accompanying drawings, I have shown an illustrative embodiment of the invention, and in order that the invention may be clearly understood, I shall proceed to describe it with reference to these drawings:

In the drawings:

Figure 1 is a side elevation of the machine disposed for transportation over the mine tracks.

Figure 2 is an elevation of the rear portion of the machine.

Figure 3 is an elevation of the forward end of the machine.

Figure 4 is an elevation of the medial portion of the machine.

Figure 5 is a plan of the forward portion of the machine.

Figure 8 is an enlarged elevation of certain winding drum and brake elements appearing on a smaller scale in Figure 2.

Figure 9 is an elevation of the separable connection between the discharge and gathering conveyors.

Figure 10 is a section on line 10—10 of Figure 5, and

Figure 11 is a plan of the pony truck.

The discharge and gathering conveyors mentioned above are indicated generally at A and B, reference being had to Figures 1, 2, 3, 4 and 5. The discharge conveyor A is the same (with some additions, as will hereinafter appear) as the pit car loader described and claimed in my co-pending application Serial No. 386,647, filed August 17, 1929, in the United States Patent Office. Only a brief description of this conveyor unit will thus be necessary.

Figure 6:
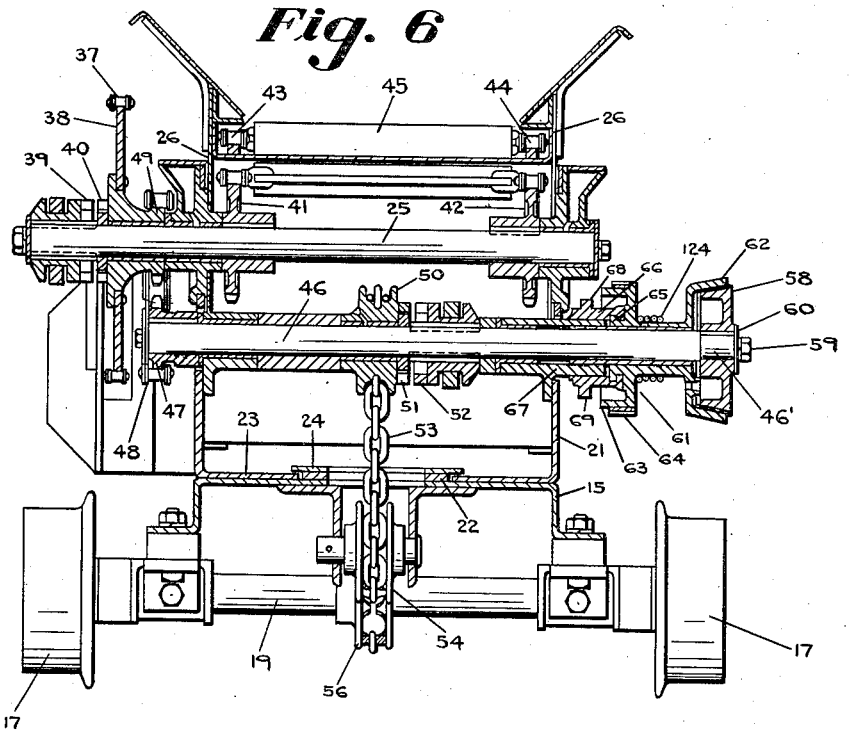
Figure 6 is a section on line 6—6 of Figure 2.

Referring particularly to Figures 1, 2, and 6, a truck frame 15 is provided with wheels as at 16 and 17, adapted to engage the rails 18 of a mine track. Both of the front wheels 17 appear in Figure 6, and as shown, are fixed upon an axle 19 suitably journaled in boxes secured to frame 15. The rear wheels 16 are similarly fixed to an axle 20 likewise journaled in boxes in connection with frame 15.

Mounted on frame 15 is a frame or turntable 21 for pivotal movement about a vertical pivot defined by ring 22, Figure 6, the ring engaging in a circular aperture formed in a bottom wall 23 of frame 21. A ring 24 superposed on ring 22 has margins overlying the margins of the aperture of bottom wall 23, and thus prevents any material bodily displacement of frame 21 relative to frame 15.

A shaft 25 is journaled in bearings of frame 21 and pivotal about this shaft is a section 26 of the trough of discharge conveyor A. The delivery section 26' of the conveyor trough is pivotal relative to section 26 about a shaft 27 and rests on a bolster 28 which is vertically adjustable on threaded rods 29 depending from the ends of arm 30 fixed to the extremity of the forward portion of section 26. Section 26 is inclined downwardly and forwardly relative to the supporting truck and has secured to its forward end a horizontally extending section 26″, section 26′ also being substantially horizontally disposed.

An electric motor 32, mounted on frame 21, drives a counter-shaft 33 through a sprocket chain 34. An idler sprocket 35 engages the chain to hold it clear of a winding drum 61 and its control appurtenances. A sprocket (not shown) on shaft 33 engages a sprocket chain 37, Figure 6, which is in driving connection with a sprocket 38 freely revoluble on shaft 25. Sprocket 38 may be placed in driving relation to shaft 25 by engagement of clutch elements 39 and 40. Sprockets 41 and 42, fixed on shaft 25, engage the lower runs of conveyor chains 43 and 44 to drive the latter, these chains being connected by means of flights 45 which on the upper run of the chain pass over the bottom of the trough sections to propel material therealong.

A shaft 46 journaled in frame 21 beneath the shaft 25 has keyed on its one end a sprocket 47 connected by means of a chain 48 with a sprocket 49 integral with the hub of sprocket 36. A sheave 50 freely revoluble on shaft 45 is adapted to be driven by the latter upon engagement of clutch elements 51 and 52, this sheave engaging a universally flexible chain 53 which is passed downwardly centrally of pivot ring 24 through an aperture in the top wall of frame 15 in engagement with sheaves 54 and 55 beneath frame 15, and forwardly and rearwardly to engage sheaves 56 and 57 fixed to axles 19 and 20 respectively. Due to the described arrangement the discharge conveyor is not only angularly adjustable relative to itself on axis 27, but it is also adjustable as a whole relative to the truck frame 21 about the horizontal axis defined by shaft 25 and the vertical axis defined by ring 24. Further, due to the universal flexibility of chain 53, the truck axles may be driven from the motor throughout a considerable range of angular adjustment of frames 15 and 21 about pivot ring 24, the conveyor chains, of course, being operable in all positions of adjustment of the conveyor trough about shaft 25.

Figure 7:
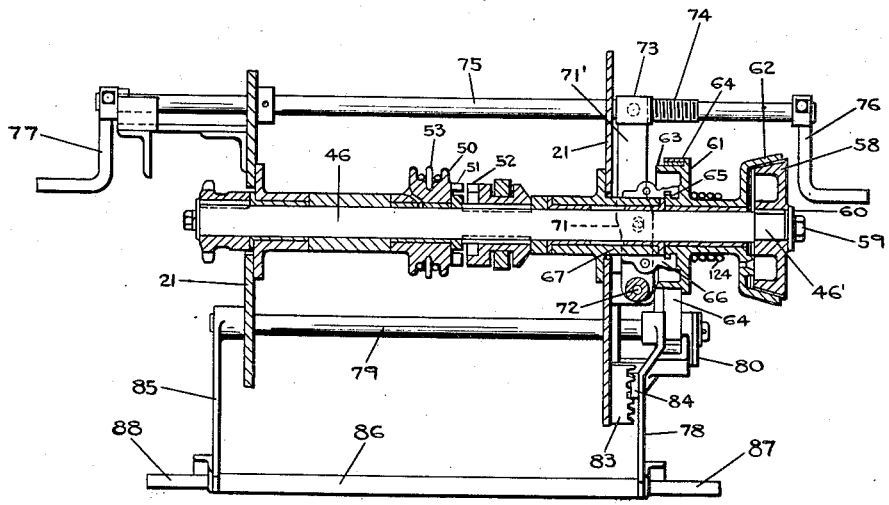
Figure 7 is a section on line 7—7 of Figure 2.

Referring particularly to Figures 6, 7 and 8, shaft 46 has a reduced end 46' to which is keyed one element 58 of a clutch, this element being secured on the shaft by means of a cap screw 59 and washer 60. Loosely mounted on shaft 46, immediately adjacent element 58, is a drum 61 having formed integral with one side wall thereof a conical flange 62 for cooperation with element 58. The opposite wall of the drum has integral therewith a cylindrical flange 63 with which is adapted to cooperate a brake band 64.

The hub of the drum within flange 63 is provided with a peripheral shoulder 65 which is engaged in an annular groove of a two-part sleeve 66 slidable on the external surface of a sleeve bearing 67 for shaft 46. Sleeve 66 has diametrically opposite studs 68 and 69 engaged in longitudinal slots formed in parallel arms 70 and 71 of a shipper member pivoted at one end on a pin 72 mounted in a bracket fixed to the frame 21. A prolongation 71' of arm 71 is pivoted through a longitudinally extending slot to a nut 73 which is engaged on a screw threaded portion 74 of a shaft 75 journaled in frame 21 parallel to shaft 46. Shaft 75 at its ends is provided with cranks 76 and 77 so that the shaft may be rotated from either side of the machine.

It will be evident that rotation of shaft 75 will cause nut 73 to travel along threaded portion 74, thus oscillating the shipper member and causing axial displacement of sleeve 66 in one direction or the other on shaft 46. Due to the connection between sleeve 66 and drum 61, the latter is forced to follow the movements of the former so that by proper manipulation of the cranks 76 and 77 the clutch elements 58 and 62 may be engaged or disengaged. Flange 63 is sufficiently wide so as never to pass out of fully cooperating relation with band 64.

Referring particularly to Figures 7 and 8, a lever 78 is fixed at its lower end on the shaft 79, which latter extends across frame 21 in parallel relation to shaft 46, this shaft being journaled in frame 21 and in the parallel walls of the bracket mentioned above, the outer of these walls being designated by reference numeral 80. One end of band 64 engages shaft 79, while the other is secured to one end of a connecting member 81 whose other end is pivoted to a pin 82 carried by lever 78, the pin being parallel to shaft 79 and spaced from the latter longitudinally of the lever. It will be apparent that oscillation of lever 78 will tighten or loosen band 64, as desired. In order that the band may be held in tension, a tooth member 83 is fixed to the side of the frame in position to cooperate with a dog point 84 fixed to lever 78. A lever 85 is fixed to the opposite extremity of shaft 79 in parallel relation to lever 78 and the two levers are joined by a cross brace 86 terminating in handles 87 and 88 so that the braking apparatus may be operated from either side of the machine.

While the primary function of the described braking apparatus is to control the rotation of drum 61, it will be evident that by engaging clutch elements 51, 52, 58 and 62, the brake apparatus may be used to brake truck wheels 16 and 17 to control the movement of the truck or to hold it stationary on the mine track. Levers 78 and 85 are of spring material, thus causing locking elements 83 and 84 to be engaged and disengaged, as desired.

At substantially the junction of trough sections 26 and 26'', there is erected an upright frame generally denoted at 89, this frame being composed of structural steel parts. Reference numerals 90, 91, 92 and 93 denote upwardly converging angle bars having their upper ends secured to a substantially horizontal plate 94. Members 90 and 93 are joined by a plate 95, and members 91 and 92 by a plate 96, while supported on the top edges of these web plates is a substantially horizontal plate 97. The upright members are also joined adjacent their tops by means of gusset plates 98, 99 and 100.

To a forwardly projecting portion of plate 94 and on the underside thereof is secured a stiffening member 101 wherein is secured in a suitable aperture a pin 102 having a head 103 disposed in an aperture of plate 94 and resting on the margins of the aperture of member 101. The lower end of pin 102 passes through a forward extension of plate 97 and a stiffening angle member 104 secured to members 92 and 93 below the plate. The lower end of pin 102 is threaded and is engaged by a nut 105.

A casting 106 is journaled on pin 102 through bushings 107 and 108. Casting 106 is provided with a socket 109 at its lower extremity and at its upper end is provided with an integral arm 110. A crane jib 111 has an end seated in socket 109, its opposite bifurcated end having journalled therein on a pin 112, a pair of sheaves designated as 113 and 113'. A frame 114 has legs journaled on the ends of pin 112 and has secured thereto, by means of adjustable nuts 115 and 116, the threaded end of a tension rod 117, whose other end is pivoted to arm 110 on a pin 118. Jib 111 is thus supported for swinging movement about an axis defined by pin 102 and may be vertically adjusted through adjustment nuts 115 and 116.

On a laterally projecting horizontal plate 119 secured to trough section 26 at the lower end of frame member 90, and on the same side of the machine as drum 61, are mounted on vertical axes two sheaves, of which one is shown at 120. At the lower end of upright 91 a similar bracket supporting a similar sheave, not shown, is fixed to section 26. On plate 95 is mounted a sheave 121, while on plate 94 mounted on vertical axes are two sheaves 122 and 123, to the latter of which a draft device 124 is adapted to be guided from sheave 121 by means of a sheave 125 mounted on a horizontal axis in a bracket supported on gusset plate 98.

In order that the forward end of the conveyor trough may be properly supported, I have provided a pair of brackets, one being shown at 126, secured to the lower ends of uprights 92 and 93 and supporting flanged rollers as at 127 on transverse horizontal pins at 128, Figures 2 and 4. The rollers are adapted to rest upon and engage the track rail when the machine is in loading position.

At the forward end of trough section 26" and on the underside thereof is secured a vertical pivot member 129 which is engaged by one end of an elbow bracket 130 which forms a mounting member for the gathering conveyor. Bracket 130 has an upwardly extending expanded web portion 131 adapted to swing about the forward end of the trough. Just above the top of the trough web 131 has secured thereto a horizontal angle bar 132 on the lower side of the horizontal web of which is mounted a centrally disposed lug 133. To the end of the conveyor trough and at its top is secured a circular casting 134 having a peripheral upstanding rib 135 which forms a guide for lug 133. Casting 134 and rib 135 are adapted to support any weight imposed thereon through bar 132 or lug 133. A pair of U-shaped bearing members 136 and 137 are secured to the top of upright portion 131, see Figure 9.

The gathering conveyor B, see particularly Figures 4, 5, and 10, comprises a bottom plate 138 bent upward at one end so as to be adapted to project above the receiving end of the discharge conveyor A with its forward portion in substantially horizontal position. Extending longitudinally of plate 138 and secured thereto substantially centrally thereof are upper and lower chain guides 139 and 140 spaced apart by means of blocks 141. Guides 139 and 140 are provided with opposed longitudinal grooves in which are engaged angle portions 142 and 143 of a chain 144 which is flexible in planes both parallel and perpendicular to plate 138. At intervals, flights 145 are secured to chain 144 so as to propel material along and on one side or the other of the chain guiding means depending upon the direction of travel of the chain. A plate 146 is secured to the tops of the upper chain guide members 139 and extending longitudinally and centrally of plate 146 is an upright baffle plate 147. At its forward end plate 147 terminates at an upright post 148 having an upper bifurcated end, Figure 3. At its rearward end the plate terminates in a block 149 in which are mounted on a horizontal transverse axis a pair of sheaves, one being shown at 150. Post 148 is braced by means of rearwardly diverging wings 152 and 153 secured at their lower ends to plate 146. The rear end of plate 147 is similarly braced by wings 154 and 155. In casting 156 at the rear end of the gathering conveyor, and mounted upon the chain guides, is journaled a shaft 157 in perpendicular relation to the inclined portion of base plate 138. On the lower end of shaft 157 is fixed a sprocket 158 which engages chain 144 to drive the latter. To the upper end of shaft 157 is keyed a beveled gear 159 engaged by a beveled pinion 160 keyed to the end of a shaft 161 journaled in a bearing 162. A motor 163 is mounted on the tops of the chain guides, with its armature shaft above the central longitudinal axis of the gathering conveyor in alignment with shaft 161 and in driving connection therewith through a coupling 164.

The inclined portion of conveyor B is provided with upwardly extending outwardly flared side plates 165 and 166 to hold material on plate 138 as it travels up the incline, the rearward end of plate 138 being cut away as indicated at 167 to permit the material to be readily discharged. Due to its disposition, gear 159 is adapted to engage fragments of material above chain 144 to assist in discharging the same over the end of the conveyor.

A bracket 168 secured to the underside of plate 138 adjacent the discharge end of the conveyor B comprises a pair of side wings 169 and 170 adapted to extend to the outside of bearing members 136 and 137, see particularly Figure 9, the wings supporting a pivot pin 171 passed through the bearing members. Pin 171 is held in position by means of cotter pins 172 and 173, which may be removed when it is desired to separate conveyors A and B. It will be noted that pin 171 has a considerable freedom of movement in an upward direction relative to members 136 and 137, this relation of the parts permitting tilting of conveyor B about its longitudinal axis relative to mounting member 130 and conveyor A.

Referring particularly to Figures 1, 3, 4 and 5, the rope 124 is adapted to be engaged at one end with drum 61 and thence to be passed forwardly in engagement with sheaves 121, and 125, and between sheaves 122 and 123. Thence the rope is passed forwardly over one of the sheaves at the end of jib 111, downwardly about sheave 150, upwardly and around the other sheave at the end of the jib, again downwardly about the sheave at the side of sheave 150, and upwardly again to have its end secured to the end of the jib as at 174. Upon rotation of drum 61 and consequent tensioning of rope 124, it will be evident that the gathering conveyor will be swung upwardly through the described rope gearing about pivot pin 171. In addition, the gathering conveyor may be swung laterally about pivot member 129, and it will be evident that due to the pivotal mounting of the jib it may be swung to position to lift the gathering conveyor in all angular relations of the latter about pivot member 129 to the discharge conveyor. The arrangement of pivot member 129 and mounting member 130 is such as to maintain the delivery end of the gathering conveyor in proper discharge relation to the receiving end of conveyor A to deliver to the latter in all positions of relative adjustment.

For transporting the machine from place to place, I have provided the pony truck shown in Figures 1 and 11. This truck comprises longitudinal frame members 175 and 176 mounted on axles 177 and 178 on the ends of which are revoluble flanged wheels 179. On a cross member 180 of the frame is centrally pivoted a bolster 181 on a vertical pin 182. Member 176 is provided with a series of perforations as at 183, in which are engageable stop pins 184 and 185 connected by a chain 186 for convenience of handling and to prevent loss. The stop pins are settable in the apertures to limit the angular movement of bolster 181 about its pivot, the ends of the bolster extending across the longitudinal frame members so that its end overlying member 176 will cooperate with the stop pins in whatever position they may be set.

The gathering conveyor B, at a point to the rear of the center of gravity, and as here shown, directly beneath the motor, is provided with a transverse inverted trough-like member 187 which is adapted to fit over a mating raised portion 188 of bolster 181 so that when these parts are engaged relative swinging of the conveyor B will enforce swinging of the bolster, the latter being limitable by means of the described stops. It will be apparent that the form of members 187 and 188 is such that when they are engaged, displacement of conveyor B in a lateral direction, or in a fore and aft direction relative to the truck, will be prevented. Member 187, however, is adapted to rock on member 188 so as to permit fore and aft rocking movement of the truck relative to the conveyor. When it is desired to move the machine to a new location after the completion of a loading operation, the rope gearing is actuated in the manner already described so as to swing the forward end of conveyor B upwardly about pin 171, its weight being carried by the wheels at the front end of conveyor A, of which one, it will be recalled, is shown at 127. The gathering conveyor is now swung about pivot member 129 into parallel relation with the mine track, and the pony truck is placed in such position on the track that upon lowering the conveyor, socket member 187 will engage member 188. When the parts have been thus engaged, rope 124 is slacked off, and since the portion of conveyor B forward of member 187 overbalances the portion to the rear thereof, the gathering end of the conveyor will pivot downwardly about member 188, lifting its rearward end and therewith the forward end of conveyor A. The end of conveyor A forward of shaft 25 somewhat overbalances its portion to the rear thereof. Conveyor B serves as a lever for lifting and retaining the forward end of conveyor A for transportation. Due to the overbalancing effect of conveyor B, it is necessary to maintain appropriate tension on rope 124 during transportation of the machine so as to keep the forward end of the conveyor at a suitable distance above the mine track.

It will be recalled that conveyor A, as well as conveyor B, is adapted for pivotal movement about a vertical axis and the two conveyors have a vertical axis of articulation at pivot 129. Hence, in rounding curves there is a tendency for the two conveyors to buckle about the latter axis, this tendency being restrained by stops 184 and 185 which are adjusted in accordance with the maximum swing permissible to the bolster.

In the operation of the machine, the pony truck is removed so that the forward end of conveyor A is supported on the mine track by the described flanged wheels, and the horizontal forward portion of conveyor B rests on the mine floor in front of the track.

The subsequent operations will depend upon the position of the material to be loaded relative to conveyor B. For example, if the material extends across the working face in front of the track, conveyor B may first be sumped into the material under the propelling force of truck wheels 16 and 17. Hereupon rope 124 may be retrieved from the hoisting sheaves, and if it is desired to swing the gathering conveyor to the left, it may be passed around one of the sheaves, as at 120, across to and around the similar sheave at the other side of the frame, then about a jack supported sheave, and thence to post 148, where its end may be anchored in the bifurcated post extremity as indicated in Figure 10. Upon tensioning of the rope through rotation of drum 61, the gathering conveyor will be swung to the left about pivot 129 to engage the exposed flights at that side in the material. Due to the application of the moving force to the upper end of post 148, the gathering conveyor will be tilted to the left about its longitudinal axis, this tilting movement being limited by engagement of pin 171 with the top and bottom of bearing members 136 and 137 respectively. This tilting of the gathering conveyor enables plate 138 to act as a scraper, and allows it to engage itself readily under the material to leave a clean floor. This operation is fully illustrated in my copending application Serial No. 448,626, filed April 30, 1930.

If it is desired to swing the conveyor to the right, rope 124 is retrieved from the disposition just described, passed around sheave 120, Figure 4, around a jack supported sheave to the right of the gathering conveyor, and anchored to post 148, as before. Motor 163 will be reversed, and the flights at the right engaged in the material upon tensioning of rope 124.

If the material to be gathered extends alongside the mine track the rope 124 is led forwardly of the machine and trained about a jack supported block back to post 148, the gathering conveyor being disposed at substantially right angles to the receiving conveyor and extending to that side of the track to which the material lies. This operation is illustrated in my copending application Serial No. 448,626.

Motor 163 is located above the longitudinal axis of conveyor B so as to permit the latter to tilt equally readily in both directions. The motor is supplied with current through a cable 190 from a control device 191 mounted on plate 97 of frame 89. Motor 163 is of relatively great power as compared to motor 32, and as has been mentioned above, is necessarily reversible so that either the right or left hand flight section of conveyor B may serve as the gathering section.

In addition to the relative adjustability of conveyors A and B made possible by the described connections, it will be recalled that the two conveyors may be entirely disconnected upon removal of pin 171 and disengagement of rope 124 with the sheaves as at 150. This separability of the two conveyors is of considerable importance in that the machine may be readily dis-assembled to this extent for transportation to the mine or for transportation from above ground to below ground when the mine is reached. Further, since the gathering conveyor is of inexpensive construction, a number of these may be provided for selective cooperation with a single discharge conveyor. That is to say, a gathering conveyor may be placed in each of a number of rooms and a single discharge conveyor may be moved from room to room for cooperation with the gathering conveyors as needed.

It will be understood that the described manipulations of the machine are merely illustrative, the machine being capable of use to suit the conditions encountered. It will be further understood that I do not limit myself to the exact structure shown and described, the invention embracing all embodiments falling under the terms of the following claims.

I claim:

1. In a machine of the class described, the combination with a truck, of an elongated conveyor mounted on said truck for pivotal movement relative thereto about a horizontal axis, the receiving end of said conveyor overbalancing its delivery end, a gathering conveyor having its delivery end pivoted to the receiving end of said first-named conveyor for movement relative thereto on a horizontal axis, a supplemental truck adapted to be placed under said gathering conveyor when the latter is elevated, and means on the gathering conveyor adapted to engage said supplemental truck when the latter is so placed, said truck engaging means being located relative to the center of gravity of said gathering conveyor to cause the receiving end of the latter when released to overbalance its delivery end and thus rock said gathering conveyor about its truck engaging means to elevate the delivery end of said gathering conveyor together with the receiving end of said elongated conveyor.

2. In loading apparatus, the combination with a truck adapted to travel along a mine track, of an elongated conveyor pivotally connected to said truck for movement relative thereto on a horizontal axis, a gathering conveyor pivoted to the receiving end of said elongated conveyor, a pony truck for supporting said gathering conveyor in elevated position for transportation, and a connection between said pony truck and said gathering conveyor for relative movement on a transverse horizontal axis at a point rearward of the center of gravity of the gathering conveyor to cause the forward portion of said gathering conveyor to move downwardly on such horizontal axis and effect elevation of the receiving end of said elongated conveyor through the pivotal connection between the conveyors.

3. In a machine of the class described, the combination with a support, an arcuate track extending around the forward end of the support at the top thereof of a gathering conveyor, a mounting member comprising an arm pivoted on an upright axis to the under side of the forward end of said support, a supporting member secured to said arm in position to rest and travel on said track, and a pivotal connection between said supporting member and said conveyor.

4. In a loading machine, the combination with a support, of a gathering conveyor connected thereto for tilting movement relative thereto on the longitudinal axis of said gathering conveyor, a post extending upwardly from the upper side of said gathering conveyor, and means comprising a draft member connected to said post at a point vertically spaced from the bottom portion of said conveyor to tilt the conveyor on its longitudinal axis.

5. In a machine of the class described, the combination with a gathering conveyor adapted to move over a mine floor, of an upright post on said conveyor, and means comprising a draft device connected to said post to tilt the conveyor about its longitudinal axis.

6. In loading apparatus, the combination with a truck adapted to travel on a mine track, of means on the truck for receiving material to be loaded, a gathering conveyor extending laterally from the mine track and connected to said receiving means for tilting movements on the longitudinal axis of the gathering conveyor, and rope gearing comprising a rope extending from one side of the truck to the other to a fixed anchorage in the mine and then to the outer portion of said gathering conveyor to effect tilting of the latter on its longitudinal axis and movement of the whole machine rectilinearly along the mine track.

7. In a loading machine, the combination with a support, of a gathering conveyor connected thereto for tilting movement on an axis extending longitudinally of said conveyor, and power-operated mechanism comprising a draft rope connected to said conveyor for both tilting the same on said longitudinal axis and moving the conveyor along the surface from which the material is to be gathered.

8. In a loading machine, the combination with a main conveyor section, means for supporting the same to receive material at positions adjacent the mine floor, a gathering conveyor section pivotally associated with the forward receiving end of said main conveyor section and movable over the mine floor to gather material therefrom, said gathering conveyor section comprising traveling conveyor flights, and means acting on said gathering conveyor eccentrically of its longitudinal axis to automatically tilt the gathering conveyor section about its longitudinally extending axis and relative to the main conveyor section and to move said gathering conveyor over the mine floor to gather material.

9. In a loading machine, the combination with a wheel mounted truck, of a discharge conveyor supported by said truck and having a horizontal portion adapted to be positioned adjacent the mine floor in advance of said truck, a gathering conveyor pivoted to the forward end of the discharge conveyor for swinging movement in a horizontal plane and tilting movement about its longitudinal axis, and means including power operated means supported by said truck for swinging and tilting said gathering conveyor.

10. In a loading machine, the combination with a support, of a gathering conveyor connected to said support for swinging movement on an upright axis relative thereto and tilting movement about the longitudinal axis of said gathering conveyor, and means for swinging and automatically tilting said gathering conveyor.

11. In a loading machine, the combination with a wheel mounted truck, of a discharge conveyor supported by said truck and having a horizontal portion adapted to be positioned adjacent the mine floor in advance of said truck, a gathering conveyor pivoted to the forward end of the discharge conveyor for swinging movement in a horizontal plane and tilting movement about its longitudinal axis, and means including power operated means supported by said truck for swinging and automatically tilting said gathering conveyor.

12. In a loading machine, the combination with a wheel mounted truck, of a motor on said truck, a discharge conveyor supported by said truck and extending in advance thereof, a gathering conveyor pivoted to the forward end of said discharge conveyor for swinging movement in a horizontal plane and tilting movement about its longitudinal axis, and flexible draft means operatively connected to said motor for swinging said gathering conveyor and tilting it about its longitudinal axis.

13. In a machine of the class described, an elongated gathering conveyor, and means to swing said conveyor horizontally about a pivoting point adjacent one of its ends to engage it in a mass of material and simultaneously to tilt it toward the material about its longitudinal axis.

14. In a machine of the class described, an elongated gathering conveyor adapted to swing over a mine floor about a pivoting point adjacent one of its ends and means for attaching a draft member to the other end of the conveyor at a point vertically spaced from the bottom portion of the latter whereby, tension being exerted on the draft member, the conveyor will be simultaneously swung about its pivoting point and tilted about its longitudinal axis.

15. In a machine of the class described, an elongated gathering conveyor adapted to swing over a mine floor about a pivoting point adjacent one of its ends, an upright post adjacent the other end of said conveyor, and a draft device secured to the upper end of said post whereby, tractive effort being exerted on the draft device to swing the conveyor about its pivoting point, the conveyor is simultaneously tilted about its longitudinal axis.

16. In a conveyor, an elongated base plate having an unobstructed lateral edge, material engaging flights adapted to be moved over the plate along said unobstructed edge, and an upright post at the foot end of said plate to the upper end of which a draft element is adapted to be attached to laterally move and tilt the plate and engage its unobstructed edge in material to be gathered.

17. In a conveyor, an elongated base plate having an unobstructed lateral edge, material engaging flights adapted to be circulated in an elongated orbit on said plate with the flights at one side traveling adjacent said edge, flight guiding means disposed within said orbit, and an upright post mounted on said guiding means at the foot end of said plate to the upper end of which a draft element is adapted to be attached to laterally move and tilt the plate and engage its unobstructed edge in material to be gathered.

18. In a conveyor, an elongated base plate having an unobstructed lateral edge, material engaging flights adapted to be circulated in an elongated orbit on said plate with the flights at one side traveling adjacent said edge, flight guiding means disposed within said orbit, an upright elongated baffle plate mounted on said guiding means and extending along the central longitudinal line of the plate, and an upright post mounted on said guiding means at the foot end of said baffle plate and to the upper end of which a draft element is adapted to be attached to laterally move and tilt the plate and engage its unobstructed edge in material to be gathered.

19. A conveyor comprising a base plate having angularly related head and foot portions, the foot portion normally assuming a substantially horizontal position with the head portion upwardly inclined therefrom, the edges of said foot portion being unobstructed, an endless flexible draft device mounted for travel longitudinally of said base plate, the advancing and returning runs of said draft device being disposed side by side, guide means for the runs of said draft device mounted on said base plate, material engaging flights on said draft device, means for circulating said draft device, an upright elongated baffle plate mounted on said guide means and extending substantially throughout the length of said foot portion along the central longitudinal line thereof, and an upright post mounted on said guide means at the foot end of said baffle plate and to the upper end of which a draft element is adapted to be attached to laterally move and tilt the plate and engage its unobstructed edge in material to be gathered.

20. In a conveyor, an elongated base plate having an unobstructed lateral edge, material engaging flights movable over the plate along said unobstructed edge, and means spaced above said plate and engageable by a draft element to move the plate laterally and simultaneously tilt it to engage its unobstructed edge in material to be gathered.

21. In a conveyor, an elongated base plate having an unobstructed lateral edge, material engaging flights movable over the plate along said unobstructed edge, and means spaced above said plate at the foot end thereof and engageable by a draft element to move the plate laterally and simultaneously tilt it to engage its unobstructed edge in material to be gathered.

22. A conveyor comprising a base plate having angularly related head and foot portions, the foot portion normally assuming a substantially horizontal position with the head portion upwardly inclined throughout its length therefrom, the edges of said foot portion being unobstructed, an endless flexible draft device mounted for travel longitudinally of said base plate, material engaging flights on said draft device, the advancing and returning runs of said draft device being disposed side by side, a head shaft on said head portion in perpendicular relation to the latter, a drive wheel on said head shaft engaging the draft device, a bevel gear on said head shaft above the wheel, a motor mounted on the lower portion of said head portion above the draft device and closely adjacent thereto, said motor having a power shaft extending with its axis in a vertical plane including the central longitudinal line of the foot portion, a pinion coaxial with the power shaft and adapted to be driven thereby, said pinion engaging said gear to drive the head shaft, and an upright post adjacent the free end of the foot portion engageable at its upper end by a draft element to move the conveyor laterally and simultaneously tilt it about the longitudinal axis of the foot portion.

NILS D. LEVIN.